(12) United States Patent
Walters et al.

(10) Patent No.: US 10,664,381 B2
(45) Date of Patent: May 26, 2020

(54) METHOD AND SYSTEM FOR SYNTHETIC GENERATION OF TIME SERIES DATA

(71) Applicant: CAPITAL ONE SERVICES, LLC, McLean, VA (US)

(72) Inventors: Austin Walters, Savoy, IL (US); Jeremy Goodsitt, Champaign, IL (US); Mark Watson, Sedona, AZ (US); Anh Truong, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/454,041

(22) Filed: Jun. 26, 2019

(65) Prior Publication Data

US 2020/0012657 A1 Jan. 9, 2020

Related U.S. Application Data

(60) Provisional application No. 62/694,968, filed on Jul. 6, 2018.

(51) Int. Cl.
*G06F 16/00* (2019.01)
*G06F 11/36* (2006.01)
(Continued)

(52) U.S. Cl.
CPC ............ *G06F 11/3608* (2013.01); *G06F 8/71* (2013.01); *G06F 9/54* (2013.01); *G06F 9/541* (2013.01);
(Continued)

(58) Field of Classification Search
CPC .................................................... G06F 16/00
See application file for complete search history.

(56) References Cited

U.S. PATENT DOCUMENTS

2014/0324760 A1* 10/2014 Marwah ................. G06N 7/005
706/52
2015/0058388 A1* 2/2015 Smigelski ............ G06F 17/141
708/208

(Continued)

OTHER PUBLICATIONS

Marc Aurelio Ranzato, Arthur Szlam, Joan Bruna, Michael Mathieu, Ronan Collobert, and Sumit Chopra, "Video (Language) Modeling: A Baseline for Generative Models of Natural Videos", Article, May 4, 2016, 15 pages, Courant Institute of Mathematical Sciences, Menlo Park, CA and New York, NY USA. https://arxiv.org/pdf/1412.6604.pdf accessed Jun. 26, 2019.

*Primary Examiner* — Khanh B Pham
(74) *Attorney, Agent, or Firm* — Finnegan, Henderson, Farabow, Garrett & Dunner, LLP

(57) ABSTRACT

Systems and methods for generating synthetic data are disclosed. For example, a system may include one or more memory units storing instructions and one or more processors configured to execute the instructions to perform operations. The operations may include receiving a dataset that includes time series data having a plurality of dimensions and generating a transformed dataset by performing a first data transformation. The first data transformation may include a time-based data processing method. The operations may include generating a synthetic transformed-dataset by implementing a data model using the transformed dataset. The data model may be configured to generate synthetic transformed-data based on a relationship between data of at least two dimensions of the transformed dataset. The operations may include generating a synthetic dataset by performing a second data transformation on the synthetic transformed-dataset. The second data transformation may include an inverse of the first data transformation.

19 Claims, 6 Drawing Sheets

(51) Int. Cl.

| | |
|---|---|
| G06N 20/00 | (2019.01) |
| G06F 9/54 | (2006.01) |
| G06F 8/71 | (2018.01) |
| H04L 29/08 | (2006.01) |
| G06F 17/16 | (2006.01) |
| G06F 17/18 | (2006.01) |
| G06N 3/04 | (2006.01) |
| G06F 16/28 | (2019.01) |
| G06F 16/242 | (2019.01) |
| G06F 16/248 | (2019.01) |
| G06F 16/25 | (2019.01) |
| G06T 7/194 | (2017.01) |
| G06T 7/246 | (2017.01) |
| G06K 9/66 | (2006.01) |
| G06T 11/00 | (2006.01) |
| G06N 3/08 | (2006.01) |
| G06N 7/00 | (2006.01) |
| G06F 16/906 | (2019.01) |
| G06K 9/62 | (2006.01) |
| G06F 16/903 | (2019.01) |
| G06F 16/9038 | (2019.01) |
| G06F 16/9032 | (2019.01) |
| G06F 21/62 | (2013.01) |
| G06N 5/04 | (2006.01) |
| G06F 16/93 | (2019.01) |
| G06Q 10/04 | (2012.01) |
| G06F 17/15 | (2006.01) |
| G06F 16/2455 | (2019.01) |
| G06F 21/60 | (2013.01) |
| G06F 30/20 | (2020.01) |
| G06K 9/03 | (2006.01) |
| G06F 40/166 | (2020.01) |
| G06F 40/20 | (2020.01) |
| G06K 9/68 | (2006.01) |
| G06K 9/72 | (2006.01) |
| G06F 16/22 | (2019.01) |
| G06F 16/335 | (2019.01) |
| G06F 40/117 | (2020.01) |
| G06F 21/55 | (2013.01) |
| H04L 29/06 | (2006.01) |
| G06T 7/254 | (2017.01) |
| H04N 21/234 | (2011.01) |
| H04N 21/81 | (2011.01) |

(52) U.S. Cl.
CPC .......... *G06F 9/547* (2013.01); *G06F 11/3628* (2013.01); *G06F 11/3636* (2013.01); *G06F 16/2237* (2019.01); *G06F 16/2264* (2019.01); *G06F 16/248* (2019.01); *G06F 16/2423* (2019.01); *G06F 16/24568* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/906* (2019.01); *G06F 16/9038* (2019.01); *G06F 16/90332* (2019.01); *G06F 16/90335* (2019.01); *G06F 16/93* (2019.01); *G06F 17/15* (2013.01); *G06F 17/16* (2013.01); *G06F 17/18* (2013.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06K 9/036* (2013.01); *G06K 9/6215* (2013.01); *G06K 9/6218* (2013.01); *G06K 9/6231* (2013.01); *G06K 9/6232* (2013.01); *G06K 9/6253* (2013.01); *G06K 9/6256* (2013.01); *G06K 9/6257* (2013.01); *G06K 9/6262* (2013.01); *G06K 9/6265* (2013.01); *G06K 9/6267* (2013.01); *G06K 9/6269* (2013.01); *G06K 9/6277* (2013.01); *G06K 9/66* (2013.01); *G06K 9/6885* (2013.01); *G06K 9/72* (2013.01); *G06N 3/04* (2013.01); *G06N 3/0445* (2013.01); *G06N 3/0454* (2013.01); *G06N 3/08* (2013.01); *G06N 3/088* (2013.01); *G06N 5/04* (2013.01); *G06N 7/00* (2013.01); *G06N 7/005* (2013.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01)

(56) References Cited

U.S. PATENT DOCUMENTS

2018/0018590 A1* 1/2018 Szeto ................. G06F 21/6254
2018/0165475 A1* 6/2018 Veeramachaneni ..... G06F 16/00

* cited by examiner

METHOD AND SYSTEM FOR SYNTHETIC GENERATION OF TIME SERIES DATA

CROSS REFERENCE TO RELATED APPLICATIONS

This application claims the benefit of U.S. Provisional Application No. 62/694,968, filed Jul. 6, 2018, the content of which is expressly incorporated herein by reference in its entirety.

BACKGROUND

Synthetic data is used in a wide variety of fields and systems, including public health systems, financial systems, environmental monitoring systems, product development systems, and other systems. Synthetic data includes, for example, anonymized actual data or fake data. Synthetic data may be needed where actual data reflecting real-world conditions, events, and/or measurements are unavailable or where confidentiality is required. Synthetic data may be used in methods of data compression to create or recreate a realistic, larger-scale data set from a smaller, compressed dataset (e.g., as in image or video compression). Synthetic data may be desirable or needed for multidimensional datasets (e.g., data with more than three dimensions).

Conventional systems and methods of generating synthetic time-series data generally suffer from deficiencies. For example, conventional approaches may be limited to generating synthetic data in a small number of dimensions (e.g., two-dimensional image data), but be unable to generate time-series data for higher-dimensional datasets (e.g., environmental data with multiple, interdependent variables). Conventional approaches may provide limited methods of generating synthetic time series (e.g., systems may be limited to random walks). Further, conventional approaches may be unable to produce synthetic data that realistically captures changes in data values over time (e.g., conventional approaches may produce unrealistic video motion). In addition, conventional systems and methods for generating synthetic data are computationally intensive. Some approaches require use of large datasets, rather than descriptors of large datasets, which inefficiently use computer resources. For example, conventional methods that tokenize or otherwise anonymize sensitive fields (e.g., personal identifiers) may require large data volumes, similar in size to an original, untokenized dataset.

Therefore, in view of the shortcomings and problems with conventional approaches to generating synthetic time-series data, there is a need for accurate, unconventional approaches that generate realistic synthetic multidimensional time-series data.

SUMMARY

The disclosed embodiments provide unconventional methods and systems for generating synthetic, multi-dimensional time series data. As compared to conventional solutions, the embodiments may quickly generate accurate, synthetic multi-dimensional time-series data at least because methods may involve training and implementing data models using transformed datasets rather than original datasets. This can improve accuracy because data transformations may be based on changes to a dataset over time. For example, embodiments may include receiving a multi-dimensional time-series dataset (e.g., a dataset with more than three dimensions); transforming a dataset (e.g., by performing a method of subtraction to generate a transformed dataset the includes the differences between time points in the time-series); and training a data model to generate synthetic transformed-data.

Consistent with the present embodiments, a system for generating synthetic datasets is disclosed. The system may include one or more memory units storing instructions and one or more processors configured to execute the instructions to perform operations. The operations may include receiving a dataset that includes time series data having a plurality of dimensions and generating a transformed dataset by performing a first data transformation on the dataset. The first data transformation may include a time-based data processing method. The operations may include generating a synthetic transformed-dataset by implementing a data model using the transformed dataset. The data model may be configured to generate synthetic transformed-data based on a relationship between data of at least two dimensions of the transformed dataset. The operations may include generating a synthetic dataset by performing a second data transformation on the synthetic transformed-dataset. The second data transformation may include an inverse of the first data transformation.

Consistent with the present embodiments, a method for generating synthetic datasets is disclosed. The method may include receiving a dataset that includes time series data having a plurality of dimensions and generating a transformed dataset by performing a first data transformation on the dataset. The first data transformation may include a time-based data processing method. The method may include generating a synthetic transformed dataset by implementing a data model using the transformed dataset. The data model may be configured to generate a synthetic transformed-dataset based on a relationship between data of at least two dimensions of the transformed dataset. The method may include generating a synthetic dataset by performing a second data transformation on the synthetic transformed-dataset. The second data transformation may include an inverse of the first data transformation.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
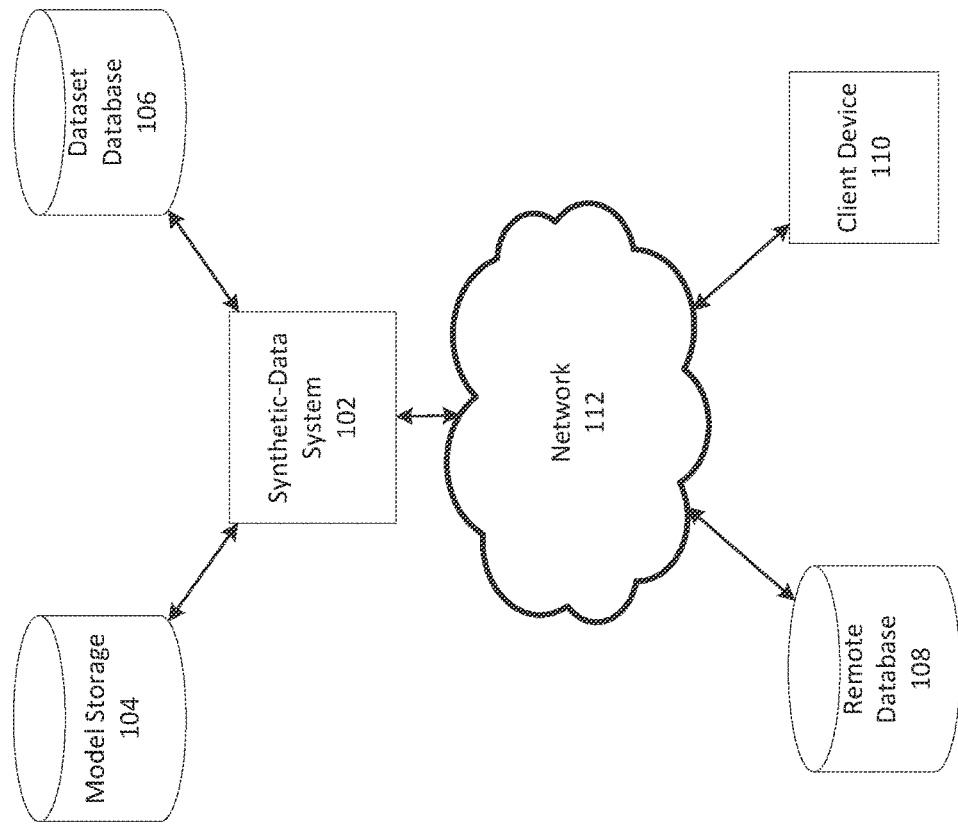
FIG. 1 depicts an exemplary system for generating synthetic data, consistent with disclosed embodiments.

Consistent with disclosed embodiments, systems and methods to generate synthetic data are disclosed. Embodiments consistent with the present disclosure are rooted in computer technology and improve computational efficiencies and increase accuracy by transforming datasets and generating synthetic data from the transformed datasets. In some embodiments, the transformation includes encoding a dataset, normalizing a dataset, and/or performing a time-based data processing on a dataset. By transforming a dataset and training a model to generate a synthetic transformed dataset, embodiments consistent with the present disclosure may simplify the dimensionality of the dataset, thereby leading to improved efficiencies and lowered usage of computing overhead as compared to conventional approaches to generating synthetic data. In this way, the embodiments provide advantages by lowering costs and resource use when generating and/or using synthetic data. Further, by transforming datasets and training models to generate synthetic transformed datasets, disclosed embodiments may generate a more realistic and accurate synthetic dataset because the transformed datasets and trained model may capture and identify underlying features and relationships of the original dataset.

Embodiments consistent with the present disclosure may include datasets. Datasets may comprise actual data reflecting real-world conditions, events, and/or measurements. In some embodiments, disclosed systems and methods may fully or partially involve synthetic data (e.g., anonymized actual data or fake data). Datasets may involve time series data, numeric data, text data, and/or image data. For example, datasets may include transaction data, financial data, demographic data, public data, government data, environmental data, traffic data, network data, transcripts of video data, genomic data, proteomic data, and/or other data.

Datasets may have a plurality of dimensions, the dimensions corresponding to variables. For example, a dataset may include a time series of 3-dimensional spatial data. Datasets of the embodiments may have any number of dimensions. As an illustrative example, datasets of the embodiments may include time series data with dimensions corresponding to longitude, latitude, cancer incidence, population density, air quality, and water quality. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (i.e., structure), including a data type, key-value pair, label, metadata, field, relationship, view, index, package, procedure, function, trigger, sequence, synonym, link, directory, queue, or the like. Datasets of the embodiments may contain foreign keys, i.e., data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties, etc. Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 depicts exemplary system 100 for generating synthetic datasets, consistent with disclosed embodiments. As shown, system 100 may include a synthetic-data system 102, a model storage 104, a dataset database 106, a remote database 108, and a client device 110. Components of system 100 may be connected to each other via a network 112.

In some embodiments, aspects of system 100 may be implemented on one or more cloud services designed to generate ("spin-up") one or more ephemeral container instances (e.g., AMAZON LAMBDA instances) in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of synthetic-data systems, model storages, dataset databases, remote databases, client devices and/or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Synthetic-data system 102 may include a computing device, a computer, a server, a server cluster, a plurality of server clusters, and/or a cloud service, consistent with disclosed embodiments. Synthetic-data system 102 may include one or more memory units and one or more processors configured to perform operations consistent with disclosed embodiments. Synthetic-data system 102 may include computing systems configured to generate, receive, retrieve, store, and/or provide data models and/or datasets, consistent with disclosed embodiments. Synthetic-data system 102 may include computing systems configured to generate and train models, consistent with disclosed embodiments. Synthetic-data system 102 may be configured to receive data from, retrieve data from, and/or transmit data to other components of system 100 and/or computing components outside system 100 (e.g., via network 112). Synthetic-data system 102 is disclosed in greater detail below (in reference to FIG. 2).

Model storage 104 may be hosted on one or more servers, one or more clusters of servers, or one or more cloud services. Model storage 104 may be connected to network 112 (connection not shown). In some embodiments, model storage 104 may be a component of synthetic-data system 102 (not shown).

Model storage 104 may include one or more databases configured to store data models (e.g., machine-learning models or statistical models) and descriptive information of data models. Model storage 104 may be configured to provide information regarding available data models to a user or another system. Databases may include cloud-based databases, cloud-based buckets, or on-premises databases. The information may include model information, such as the type and/or purpose of a model and any measures of classification error. Model storage 104 may include one or more databases configured to store indexed and clustered models for use by synthetic-data system 100. For example, model storage 104 may store models associated with generalized representations of those models (e.g., neural network architectures stored in TENSORFLOW or other standardized formats). Databases may include cloud-based databases (e.g., AMAZON WEB SERVICES RELATIONAL DATABASE SERVICE) or on-premises databases.

Dataset database 106 may include one or more databases configured to store data for use by system 100, consistent with disclosed embodiments. In some embodiments, dataset database may be configured to store datasets and/or one or more dataset indexes, consistent with disclosed embodiments. Dataset database 106 may include a cloud-based database (e.g., AMAZON WEB SERVICES RELATIONAL DATABASE SERVICE) or an on-premises database. Dataset database 106 may include datasets, model data (e.g., model parameters, training criteria, performance metrics, etc.), and/or other data, consistent with disclosed embodiments. Dataset database 106 may include data received from one or more components of system 100 and/or computing components outside system 100 (e.g., via network 112). In some embodiments, dataset database 106 may be a component of synthetic-data system 102 (not shown).

Remote database 108 may include one or more databases configured to store data for use by system 100, consistent with disclosed embodiments. Remote database 108 may be configured to store datasets and/or one or more dataset indexes, consistent with disclosed embodiments. Remote database 108 may include a cloud-based database (e.g., AMAZON WEB SERVICES RELATIONAL DATABASE SERVICE) or an on-premises database.

Client device 110 may include one or more memory units and one or more processors configured to perform operations consistent with disclosed embodiments. In some embodiments, client device 110 may include hardware, software, and/or firmware modules. Client device 110 may include a mobile device, a tablet, a personal computer, a terminal, a kiosk, a server, a server cluster, a cloud service, a storage device, a specialized device configured to perform methods according to disclosed embodiments, or the like.

At least one of synthetic-data system 102, model storage 104, dataset database 106, remote database 108, or client device 110 may be connected to network 112. Network 112 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 112 may be connected to other networks (not depicted in FIG. 1) to connect the various system components to each other and/or to external systems or devices. In some embodiments, network 112 may be a secure network and require a password to access the network.

Figure 2:
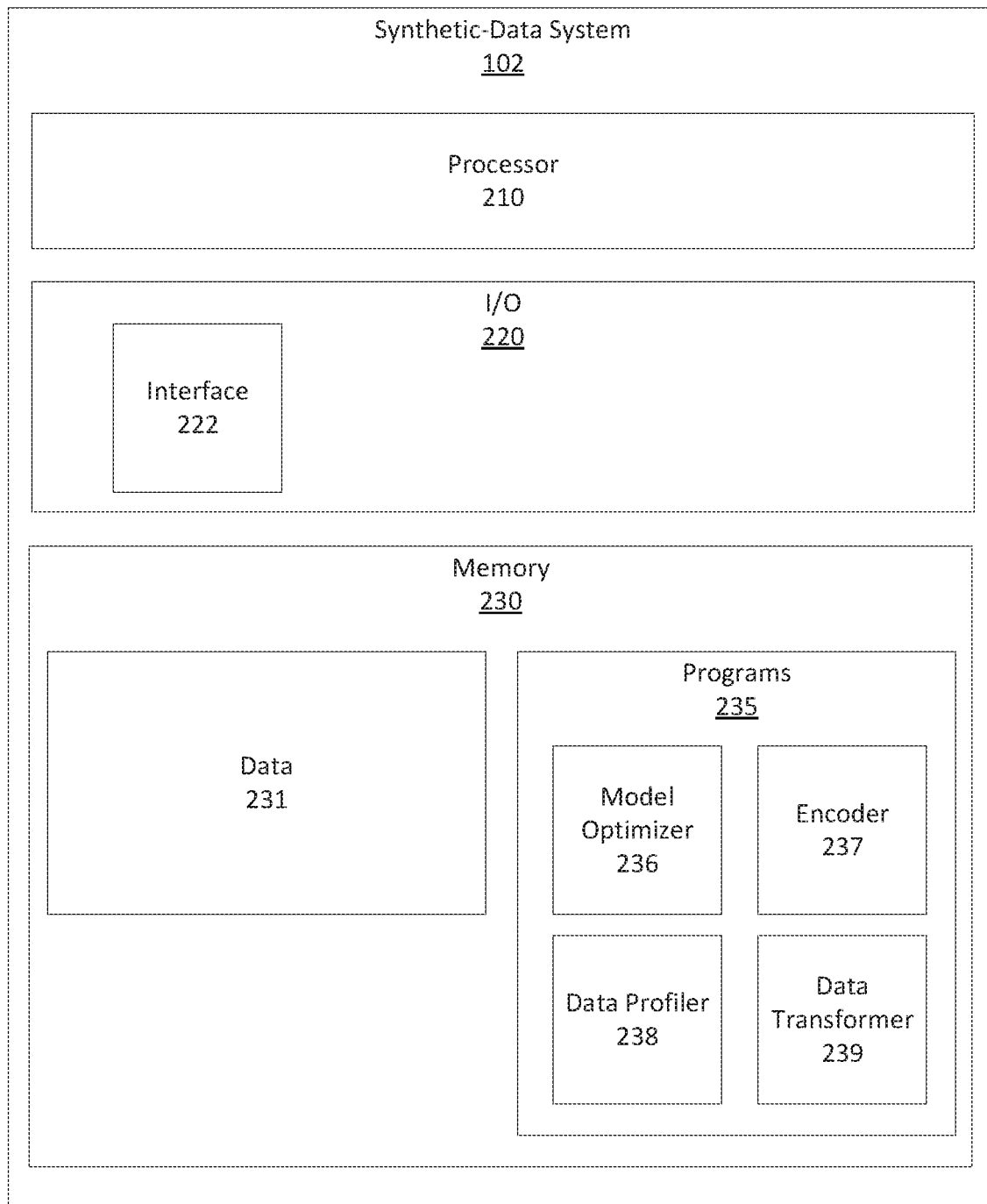
FIG. 2 depicts an exemplary synthetic data-generation system, consistent with disclosed embodiments.

FIG. 2 depicts exemplary synthetic-data system 102, consistent with disclosed embodiments. Synthetic-data system 102 may include a computing device, a computer, a server, a server cluster, a plurality of clusters, and/or a cloud service, consistent with disclosed embodiments. As shown, synthetic-data system 102 may include one or more processors 210, one or more I/O devices 220, and one or more memory units 230. In some embodiments, some or all components of synthetic-data system 102 may be hosted on a device, a computer, a server, a cluster of servers, or a cloud service. In some embodiments, synthetic-data system 102 may be a scalable system configured to efficiently manage resources and enhance security by provisioning computing resources in response to triggering events and terminating resources after completing a task (e.g., a scalable cloud service that spins up and terminates container instances).

FIG. 2 depicts an exemplary configuration of synthetic-data system 102. As will be appreciated by one skilled in the art, the components and arrangement of components included in synthetic-data system 102 may vary. For example, as compared to the depiction in FIG. 2, synthetic-data system 102 may include a larger or smaller number of processors, I/O devices, or memory units. In addition, synthetic-data system 102 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may comprise known computing processors, including a microprocessor. Processor 210 may constitute a single-core or multiple-core processor that executes parallel processes simultaneously. For example, processor 210 may be a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 210 may execute various instructions stored in memory 230 to perform various functions of the disclosed embodiments described in greater detail below. Processor 210 may be configured to execute functions written in one or more known programming languages.

I/O devices 220 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 220 may be components of an interface 222 (e.g., a user interface).

Interface 222 may be configured to manage interactions between system 100 and other systems using network 112. In some aspects, interface 222 may be configured to publish data received from other components of system 100. This data may be published in a publication and subscription framework (e.g., using APACHE KAFKA), through a network socket, in response to queries from other systems, or using other known methods. Data may be synthetic data, as described herein. As an additional example, interface 222 may be configured to provide information received from other components of system 100 regarding datasets. In various aspects, interface 222 may be configured to provide data or instructions received from other systems to components of system 100. For example, interface 222 may be configured to receive instructions for generating data models (e.g., type of data model, data model parameters, training data indicators, training parameters, or the like) from another system and provide this information to programs 235. As an additional example, interface 222 may be configured to receive data including sensitive data from another system (e.g., in a file, a message in a publication and subscription framework, a network socket, or the like) and provide that data to programs 235 or store that data in, for example, data 231, dataset database 106, and/or remote database 108.

In some embodiments, interface 222 may include a user interface configured to receive user inputs and provide data to a user (e.g., a data manager). For example, interface 222 may include a display, a microphone, a speaker, a keyboard, a mouse, a track pad, a button, a dial, a knob, a printer, a light, an LED, a haptic feedback device, a touchscreen and/or other input or output devices.

Memory 230 may be a volatile or non-volatile, magnetic, semiconductor, optical, removable, non-removable, or other type of storage device or tangible (i.e., non-transitory) computer-readable medium, consistent with disclosed embodiments. As shown, memory 230 may include data 231, including one of at least one of encrypted data or unencrypted data. Consistent with disclosed embodiments, data 231 may include datasets, model data (e.g., model parameters, training criteria, performance metrics, etc.), and/or other data.

Programs 235 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 235 may be written in one or more programming or scripting languages. One or more of such software sections or modules of memory 230 may be integrated into a computer system, non-transitory computer-readable media, or existing communications software. Programs 235 may also be implemented or replicated as firmware or circuit logic.

Programs 235 may include a model optimizer 236, an encoder 237, a data profiler 238, a data transformer 239, and/or other components (e.g., modules) not depicted to perform methods of the disclosed embodiments. In some embodiments, modules of programs 235 may be configured to generate ("spin up") one or more ephemeral container instances (e.g., an AMAZON LAMBDA instance) to perform a task and/or to assign a task to a running (warm) container instance, consistent with disclosed embodiments. Modules of programs 235 may be configured to receive, retrieve, and/or generate models, consistent with disclosed embodiments. Modules of programs 235 may be configured to perform operations in coordination with one another. In some embodiments, programs 235 may be configured to conduct an authentication process, consistent with disclosed embodiments.

Model optimizer 236 may include programs (scripts, functions, algorithms) to train, implement, store, receive, retrieve, and/or transmit one or more machine-learning models. Machine-learning models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a natural-language model, and/or another machine-learning model. Models may be trained to take in a prior frame (i.e., data sample at prior timepoint), identify information relevant for predictions, and predict the next frame (i.e., data sample at a subsequent timepoint). For example, attention networks may use transformers comprising encoders and decoders, which may be configured to highlight and/or identify information, and mask, rank, and/or pass the identified information through model layers. As another example, temporal CNNs may dilate (i.e., perform convolution with a wide kernel) and pass important values through model layers. As yet another example, RNN-CNN may maintain a memory or history of data changes over time and learn to synthesize important data features between frames. Models may include an ensemble model (i.e., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. Model optimizer 236 may be configured to adjust model parameters during training. Model parameters may include weights, coefficients, offsets, or the like. Training may be supervised or unsupervised.

Model optimizer 236 may be configured to train machine learning models by optimizing model parameters and/or hyperparameters (i.e., hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Model optimizer 236 may be configured to optimize statistical models using known optimization techniques.

In some embodiments, model optimizer 236 may be configured to generate models based on instructions received from another component of system 100 and/or a computing component outside system 100 (e.g., via interface 222, from client device 110, etc.). For example, model optimizer 236 can be configured to receive a visual (e.g., graphical) depiction of a machine learning model and parse that graphical depiction into instructions for creating and training a corresponding neural network. Model optimizer 236 can be configured to select model training parameters.

This selection can be based on model performance feedback received from another component of system 100. Model optimizer 236 can be configured to provide trained models and descriptive information concerning the trained models to model storage 104.

Model optimizer 236 may be configured to train data models to generate synthetic data based on an input dataset (e.g., a dataset comprising actual data). For example, model optimizer 236 may be configured to train data models to generate synthetic data by identifying and replacing sensitive information in a dataset. In some embodiments, model optimizer 236 may be configured to train data models to generate synthetic data based on a data profile (e.g., a data schema and/or a statistical profile of a dataset). For example, model optimizer 236 may be configured to train data models to generate synthetic data to satisfy a performance criterion. Performance criteria may be based on a similarity metric representing a measure of similarity between a synthetic dataset and another dataset.

Encoder 237 may include programs (scripts, functions, algorithms) to encode data, consistent with disclosed embodiments. In some embodiments, encoder 237 may include programs to transform string data (e.g., character data or other non-numeric data) into numeric data (e.g., to transform letters, words, or other strings into numbers according to a table). In some embodiments, encoder 237 may be configured to receive, train, and/or implement a machine learning model configured for natural-language processing (i.e., a natural-language model). In some embodiments, encoder 237 may be configured to implement a natural-language model to encode string data as numeric data. For example, encoder 237 may transform words and/or phrases into numbers by applying a lexicon, a parser, and a grammar rule system. In some embodiments, encoder 237 is configured to receive, train, and/or implement an autoencoder model or components of an autoencoder model (e.g., an encoder model or a decoder model). In some embodiments, encoder 237 is configured to implement an autoencoder model to reduce the dimensionality of a dataset.

Data profiler 238 may include programs configured to retrieve, store, and/or analyze properties of data models and datasets. For example, data profiler 238 may include or be configured to implement one or more data-profiling models. A data-profiling model may include machine-learning models and statistical models to determine a data schema and/or a statistical profile of a dataset (i.e., to profile a dataset), consistent with disclosed embodiments. A data-profiling model may include an RNN model, a CNN model, or other machine-learning model.

In some embodiments, data profiler 238 may include algorithms to determine a data type, key-value pairs, row-column data structure, statistical distributions of information such as keys or values, or other property of a data schema may be configured to return a statistical profile of a dataset (e.g., using a data-profiling model). In some embodiments, data profiler 238 may be configured to implement univariate and multivariate statistical methods. Data profiler 238 may include a regression model, a Bayesian model, a statistical model, a linear discriminant analysis model, or other classification model configured to determine one or more descriptive metrics of a dataset. For example, data profiler 238 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, data profiler 238 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, data profiler 238 may be configured to generate a similarity metric representing a measure of similarity between data in a dataset. A similarity metric may be based on a correlation, covariance matrix, a variance, a frequency of overlapping values, or other measure of statistical similarity.

In some embodiments, data profiler 238 may be configured to classify a dataset. Classifying a dataset may include determining whether a data-set is related to another datasets. Classifying a dataset may include clustering datasets and generating information indicating whether a dataset belongs to a cluster of datasets. In some embodiments, classifying a dataset may include generating data describing a dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

Data profiler 238 may be configured to classify a dataset based on data-model output, consistent with disclosed embodiments. For example, data profiler 238 may be configured to classify a dataset based on a statistical profile of a distribution of activation function values. In some embodiments, data profiler 238 may be configured to classify a dataset at least one of an edge, a foreign key, a data schema, or a similarity metric, consistent with disclosed embodiments. In some embodiments, the similarity metric represents a statistical similarity between data-model output of a first dataset and a second dataset, consistent with disclosed embodiments. As another example, data classification module may classify a dataset as a related dataset based on determination that a similarity metric between a dataset and a previously classified dataset satisfies a criterion.

Data transformer 239 may include programs (scripts, functions, algorithms) to perform methods of data transformation, consistent with disclosed embodiments. In some embodiments, data transformer 239 is configured to perform a normalization method (i.e., to normalize data). Normalizing data may include applying statistical methods to adjust data values. Normalizing data may include transform data having particular units (e.g., dollars, degrees, density, concentration, etc.) into unit-less data (e.g., ratios, percentiles, quantiles, or the like). For example, data transformer 239 may be configured to divide data by an average, determine a standard score based on parameters of a normal distribution, determine a student t-score based estimated parameters of a distribution, perform feature scaling methods, estimate a coefficient of variation, or the like.

In some embodiments, data transformer 239 may be configured to perform data processing methods, including time-based data processing methods, consistent with disclosed embodiments. The time-based data processing method may include a subtraction method in one or more dimensions (i.e., to generate a difference dataset). For example, data transformer 239 may be configured to generate a transformed dataset by subtracting data associated with a plurality of first time points from data associated with a plurality of second time points. The first time points and second time points may overlap. In some embodiments, data transformer 239 may partition first time points and second time points based on a features or relationships of data to generate "frames" or data segments of the data in two or more dimensions (i.e., data transformer 239 may partition a dataset into frames). For example, data transformer 239 may partition a dataset based on minimum or maximum values, a measure of periodicity (e.g., an autocorrelation measure), and/or any other statistical property of dataset. In some embodiments, data transformer 239 use a data model and/or trains a data model to partition data (e.g., in coordination with model optimizer 236).

In some embodiments, data transformer 239 may train a model to predict a difference between frames. As an illustrative example, in a dataset comprising video data comprised of a series of two-dimensional images, data transformer 239 may generate a series of difference images by using a subtraction method to subtract data associated with a preceding image from data associated with a subsequent image. In this way, data transformer 239 may generate "motion vectors" based on an input dataset. As one of skill in the art will appreciate, time-based data processing methods consistent with the present disclosure may include methods performed on any number of dataset dimensions (e.g., on three or more dimensions).

In some embodiments, the time-based processing method may include a ratio method (i.e., calculating ratio of data at different time points or estimating a percent change in data between timepoints). Data transformer 239 may be configured to generate transformed data by applying any mathematical function to a dataset (e.g., a logarithm, a Fourier transform, a co-sine function, etc.). For example, data transformer 239 may be configured to apply a logarithm to generate a transformed dataset. As an example, data transformer 239 may apply a logarithmic function and a subtraction method to generate the log-return of stock prices. In some embodiments, data transformer 239 may be configured to determine that data changes according to a geometric progression and apply a logarithmic function to data.

Data transformer 239 may be configured to perform a method of data transformation that is an inverse of another method of data transformation, consistent with disclosed embodiments. Data transformer 239 may be configured to perform an inverse of any data transformation previously performed by data transformer 239. For example, data transformer 239 may be configured to transform data encoded as numeric data into string data (e.g., based on a table or by applying a decoder model of an autoencoder model). As another example, data transformer 239 may be configured to invert a normalization by transforming normalized data into data having the same units as an original dataset (e.g., to convert a z-score or quantile to dollars, degrees, density, concentration, or the like). In some embodiments, data transformer 239 may be configured to invert a data transformation on data processed using a time-based data processing method. For example, data transformer 239 may be configured to perform a method of addition to invert a method of subtraction by adding a difference dataset associated with a timepoint to another dataset. Other examples may include applying an exponential function to invert a logarithm, applying an inverse Fourier transform, etc.

Figure 3:
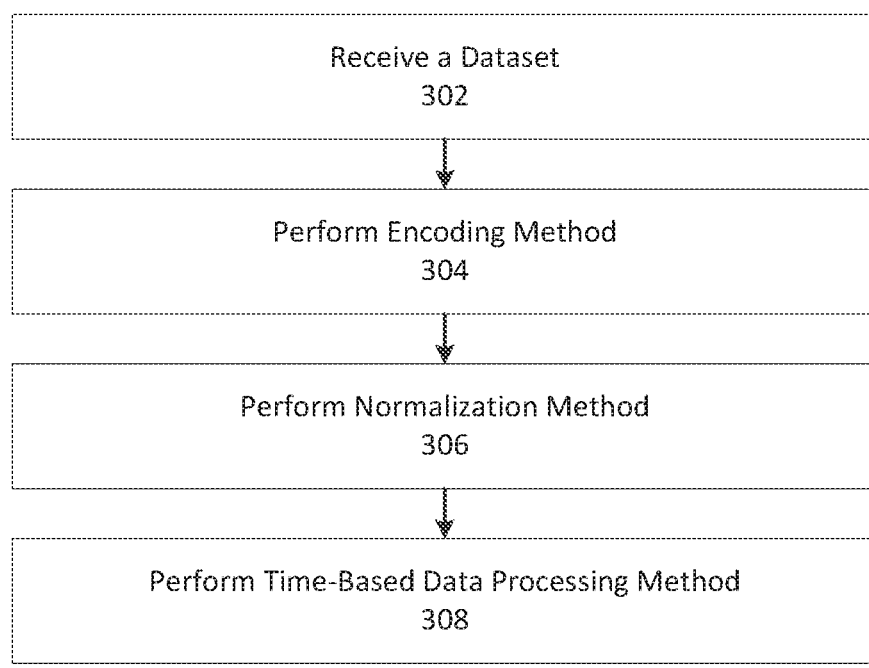
FIG. 3 depicts an exemplary process for transforming a dataset, consistent with disclosed embodiments.

FIG. 3 depicts exemplary process 300 for transforming a dataset, consistent with disclosed embodiments. In some embodiments, synthetic-data system 102 may perform process 300 using programs 235. One or more of model optimizer 236, encoder 237, data profiler 238, data transformer 239, and/or other components of programs 235 may perform operations of process 300, consistent with disclosed embodiments. It should be noted that other components of system 100, including, for example, client device 110 may perform operations of one or more steps of process 300.

Consistent with disclosed embodiments, steps of process 300 may be performed on one or more cloud services using one or more ephemeral container instances (e.g., AMAZON LAMBDA). For example, at any of the steps of process 300, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 300 may be performed as part of an application interface (API) call.

At step 302, synthetic-data system 102 may receive a dataset, consistent with disclosed embodiments. In some embodiments, step 302 may include receiving a dataset from data 231, one or more client devices (e.g., client device 110), dataset database 106, remote database 108, and/or a computing component outside system 100. Step 302 may include retrieving a dataset from a data storage (e.g., from data 231, dataset database 106, and/or remote database 108). A dataset of step 302 may include any of the types of datasets previously described or any other type of dataset. A dataset of step 302 may have a range of dimensions, formats, data schema, and/or statistical profiles. A dataset of step 302 may include time series data.

At step 304, synthetic-data system 102 may perform an encoding method, consistent with disclosed embodiments. The encoding method may include any encoding method previously described herein and/or any other encoding method. For example, the encoding method may include an encoding method described in reference to encoder 237. In some embodiments, an encoding method of step 304 may include encoding a dataset received at step 302, encoding a dataset generated using the normalization method of step 306 (described in further detail below), and/or encoding a dataset generated using the time-based data processing method of step 308 (described in further detail below).

At step 306, synthetic-data system 102 may perform a normalization method, consistent with disclosed embodiments. The normalization method may include any normalization method previously described herein and/or any other normalization method. For example, the normalization method may include a normalization method described in reference to data transformer 239. In some embodiments, a normalization method of step 306 may include normalizing a dataset received at step 302, normalizing a dataset generated using the encoding method of step 304, and/or normalizing a dataset generated using the time-based data processing method of step 308.

At step 308, synthetic-data system 102 may perform a time-based data processing method, consistent with disclosed embodiments. As previously described, the time-based data-processing method may include a subtraction method and/or a ratio method. In some embodiments, the time-based data processing method includes applying a mathematical function to a dataset. In some embodiments, the mathematical function includes a logarithm. The time-based data processing method may include a time-based data processing method described in reference to data transformer 239 and/or any other time-based data processing method. In some embodiments, a time-based data processing method of step 308 may include processing a dataset received at step 302, processing a dataset generated using the encoding method of step 304, and/or processing a dataset generated using normalization method of step 306.

Figure 4:
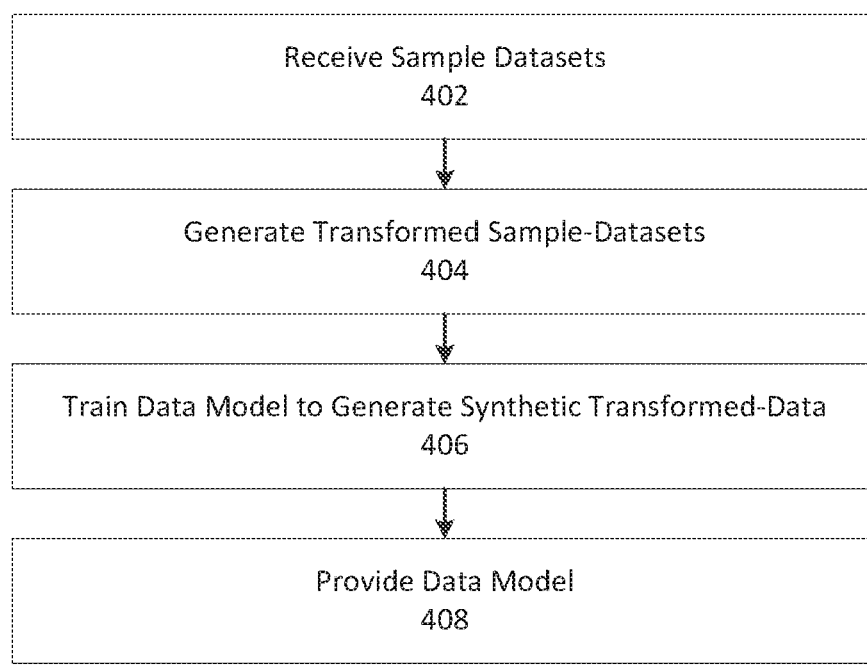
FIG. 4 depicts an exemplary process for training a synthetic data model, consistent with disclosed embodiments.

FIG. 4 depicts exemplary process 400 for training a synthetic data model, consistent with disclosed embodiments. In some embodiments, synthetic-data system 102 may perform process 400 using programs 235. One or more of model optimizer 236, encoder 237, data profiler 238, data transformer 239, or other components of programs 235 may perform operations of process 400, consistent with disclosed embodiments. It should be noted that other components of system 100, including, for example, client device 110 may perform operations of one or more steps of process 400.

Consistent with disclosed embodiments, steps of process 400 may be performed on one or more cloud services using one or more ephemeral container instances (e.g., AMAZON LAMBDA). For example, at any of the steps of process 400, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 400 may be performed as part of an application interface (API) call.

At step 402, synthetic-data system 102 may receive one or more sample datasets, consistent with disclosed embodiments. In some embodiments, step 402 may include receiving a dataset from data 231, one or more client devices (e.g., client device 110), dataset database 106, remote database 108, and/or a computing component outside system 100. Step 402 may include retrieving a dataset from a data storage (e.g., from data 231, dataset database 106, and/or remote database 108). A dataset of step 402 may include any of the types of datasets previously described or any other type of dataset. A dataset of step 402 may have a range of dimensions, formats, data schema, and/or statistical profiles. A dataset of step 402 may include time series data.

At step 404, synthetic-data system 102 may generate one or more transformed sample-datasets corresponding to sample datasets, consistent with disclosed embodiments. In some embodiments, generating a transformed sample-dataset may include performing one or more steps of process 300. For example, generating a transformed sample-dataset may include performing an encoding method, performing a normalization method, and/or performing a time-based data processing method, consistent with disclosed embodiments. For example, generating a transformed sample-dataset may include performing a subtraction method in one or more dimensions of a sample-dataset (e.g., subtracting data associated with a plurality of first time points from data associated with a plurality of second time points to generate "motion vectors" as previously described). In some embodiments, generating a transformed sample-dataset may include partitioning data as previously described.

At step 406, synthetic-data system 102 may train one or more data models to generate synthetic data based on transformed sample-datasets, consistent with disclosed embodiments. A data model of step 406 may include an RNN-CNN model, an LSTM-CNN model, an attention network model, a temporal CNN model, and/or another machine learning model. In some embodiments, the data model may be trained to generate synthetic transformed sample-datasets based on a seed. A seed may include a random seed, a manually crafted seed, and/or a sample of a transformed dataset.

In some embodiments, training a data model at step 406 may include training a data model to generate synthetic transformed-data based on a relationship between data of at least two dimensions of a transformed dataset. For example, training a data model may include training a model to generate a synthetic transformed sample-dataset with a covariance that matches, within a tolerance, a covariance of the corresponding synthetic transformed sample-dataset.

In some embodiments, training of a data model may terminate at step 406, for example when a training criterion is satisfied. Training criteria may include a number of epochs, a training time, a performance metric (e.g., a similarity metric of the sample-datasets and a synthetic dataset), or the like. Step 406 may include adjusting model parameters during training and/or hyperparameter tuning. Model parameters may include weights, coefficients, offsets, or the like. Training at step 406 may be supervised or unsupervised.

In some embodiments, training a data model at step 406 may include generating, receiving, or retrieving a data model, consistent with disclosed embodiments. Generating a data model may include initializing a data model with model parameters (i.e., seeding a model). Retrieving a data model at step 406 may include retrieving a data model from data 231, model storage 104, and/or another data storage.

In some embodiments, synthetic-data system 102 may train a data model at step 406 based on a previously trained data model, a similarity metric of a sample dataset to another dataset, a data schema, and/or a statistical metric of a dataset. For example, synthetic-data system 102 may generate or retrieve a data model for training based on an indication that a previously-trained data model met a performance criterion when generating synthetic data using a dataset with a particular data profile, on a similarity metric, and/or on a statistic metric. Synthetic-data system 102 may select a model type, model parameter, and/or model hyperparameter of a generated or retrieved data model based on a previously-trained data model.

At step 408, synthetic-data system 102 may provide a data model, consistent with disclosed embodiments. Providing a data model may include storing a data model (e.g., in data 231 and/or model storage 104). Providing a data model may include transmitting a data model to another component of system 100 (e.g., client device 110) and/or a component outside system 100.

Figure 5:
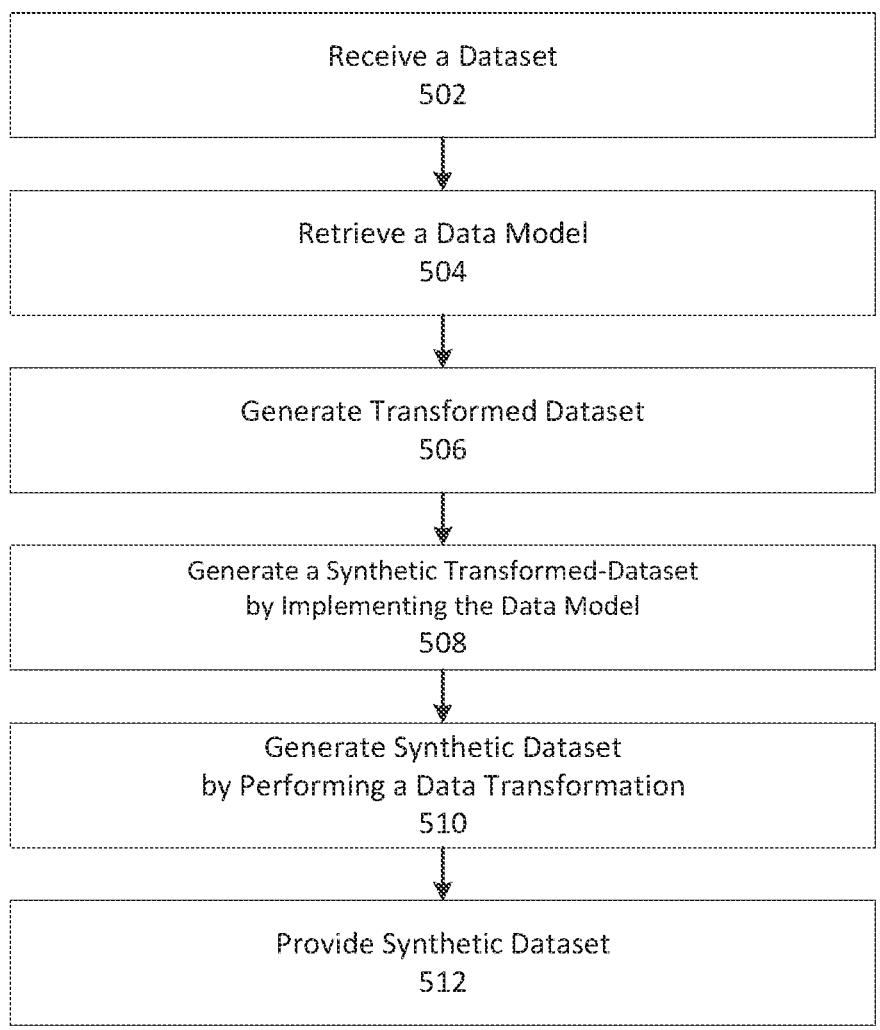
FIG. 5 depicts an exemplary process for generating synthetic data, consistent with disclosed embodiments.

FIG. 5 depicts exemplary process 500 for generating synthetic data, consistent with disclosed embodiments. In some embodiments, synthetic-data system 102 may perform process 500 using programs 235. One or more of model optimizer 236, encoder 237, data profiler 238, data transformer 239, or other components of programs 235 may perform operations of process 500, consistent with disclosed embodiments. It should be noted that other components of system 100, including, for example, client device 110 may perform operations of one or more steps of process 500.

Consistent with disclosed embodiments, steps of process 500 may be performed on one or more cloud services using one or more ephemeral container instances (e.g., AMAZON LAMBDA). For example, at any of the steps of process 500, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an application interface (API) call.

At step 502, synthetic-data system 102 may receive a dataset, consistent with disclosed embodiments. In some embodiments, step 502 may include receiving a dataset from data 231, one or more client devices (e.g., client device 110), dataset database 106, remote database 108, and/or a computing component outside system 100. Step 502 may include retrieving a dataset from a data storage (e.g., from data 231, dataset database 106, and/or remote database 108). A dataset of step 502 may include any of the types of datasets previously described or any other type of dataset. A dataset of step 502 may have a range of dimensions, formats, data schema, and/or statistical profiles. A dataset of step 502 may include time series data.

At step 504, synthetic-data system 102 may retrieve a data model, consistent with disclosed embodiments. Retrieving a data model may be based on a received dataset (e.g., based on a data profile of a received dataset). In some embodiments, step 504 may include retrieving a data model trained via process 400. A data model of step 504 may include an RNN-CNN model, an LSTM-CNN model, an attention network model, a temporal CNN model, and/or another machine learning model. Retrieving a data model may include retrieving a data model from data 231, model storage 106, and/or another data storage.

At step 506, synthetic-data system 102 may generate a transformed dataset based on a received dataset, consistent with disclosed embodiments. In some embodiments, generating a transformed dataset may include performing one or more steps of process 300. For example, generating a transformed dataset may include performing an encoding method, performing a normalization method, and/or performing a time-based data processing method, consistent with disclosed embodiments. For example, generating a transformed dataset may include performing a subtraction method in one or more dimensions of a dataset (e.g., subtracting data associated with a plurality of first time points from data associated with a plurality of second time points).

At step 508, synthetic-data system 102 may generate a synthetic transformed-dataset by implementing a data model using a transformed dataset, consistent with disclosed embodiments. In some embodiments, step 508 may include training a synthetic data model using a transformed dataset to generate synthetic data according to a performance criterion. The performance criterion may include a similarity metric between a synthetic transformed-dataset and a transformed-dataset.

At step 510, synthetic-data system 102 may generate a synthetic dataset by performing a data transformation on a synthetic-transformed dataset, consistent with disclosed embodiments. In some embodiments, a data transformation of step 510 may include an inverse of a data transformation previously performed at step 506. For example, at step 510, synthetic-data system 102 may generate a synthetic dataset by inverting a time-based data processing method (e.g., a method of subtraction), a normalization method, or an encoding method.

At step 512, synthetic-data system 102 may provide a synthetic dataset, consistent with disclosed embodiments. Providing a synthetic dataset may include storing a synthetic dataset (e.g., in data 231 and/or dataset database 106). Providing a synthetic dataset may include transmitting a synthetic dataset to another component of system 100 (e.g., client device 110) and/or a component outside system 100. In some embodiments, step 512 may include storing a data model in a data storage (e.g., data 231 and/or model storage 104). In some embodiments, step 512 may include transmitting a data model to another component of system 100 and/or a computing component outside system 100.

Figure 6:
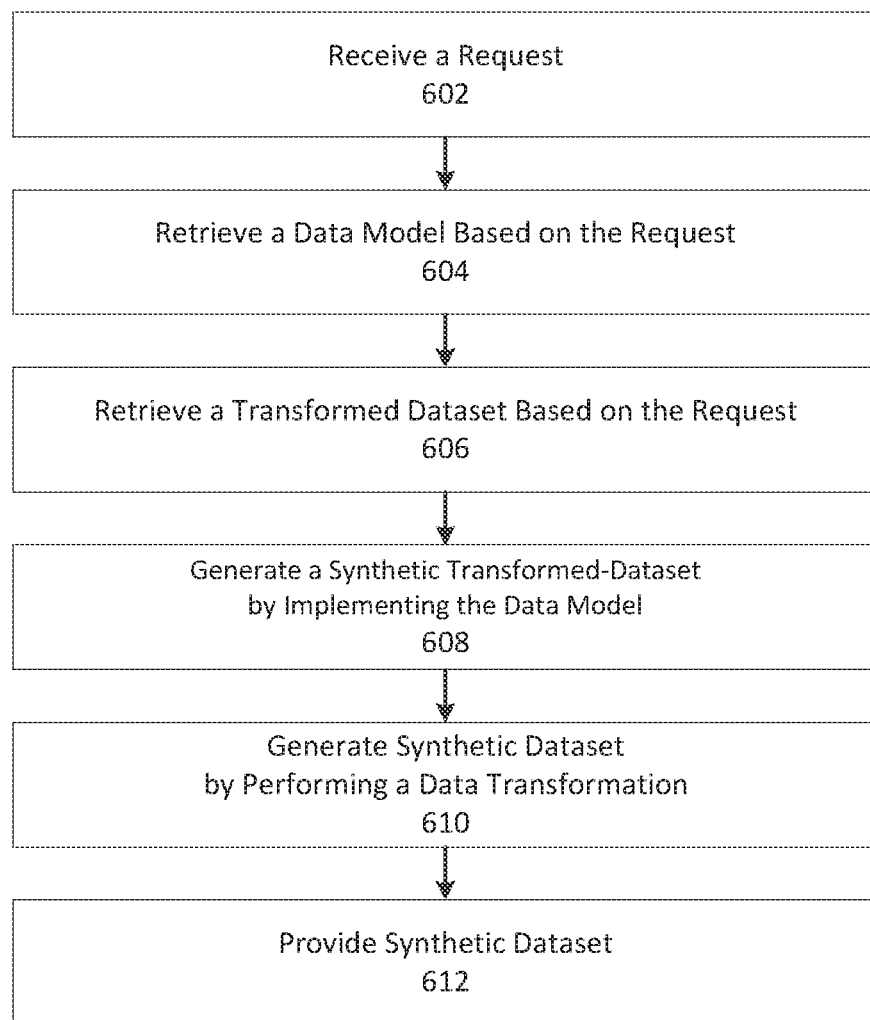
FIG. 6 depicts an exemplary process for generating synthetic data based on a request, consistent with disclosed embodiments

FIG. 6 depicts exemplary process 600 for generating synthetic data based on a request, consistent with disclosed embodiments. In some embodiments, synthetic-data system 102 may perform process 600 using programs 235. One or more of model optimizer 236, encoder 237, data profiler 238, data transformer 239, or other components of programs 235 may perform operations of process 600, consistent with disclosed embodiments. It should be noted that other components of system 100, including, for example, client device 110 may perform operations of one or more steps of process 600.

Consistent with disclosed embodiments, steps of process 600 may be performed on one or more cloud services using one or more ephemeral container instances (e.g., AMAZON LAMBDA). For example, at any of the steps of process 600, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 602, synthetic-data system 102 may receive a request, consistent with disclosed embodiments. In some embodiments, step 602 may include receiving a request from data 231, one or more client devices (e.g., client device 110), dataset database 106, remote database 108, and/or a computing component outside system 100. The request may include an instruction to generate a synthetic dataset. In some embodiments, the request may include information relating to a data profile of a desired synthetic dataset (e.g., data describing a data schema and/or a statistical measure of a dataset). Information relating to a data profile of the desired synthetic dataset may include a number of dataset dimensions and/or a dataset format. A desired synthetic dataset may include time series data. In some embodiments, the request may specify a method of data transformation (e.g., a method of encoding, a method of normalization, and/or a time-based method of data processing).

At step 604, synthetic-data system 102 may retrieve a data model based on the request, consistent with disclosed embodiments. Retrieving a data model may be based on information relating to a data profile of a desired dataset. In some embodiments, retrieving a data model may be based on a method of data transformation specified by the request (e.g., synthetic-data system 102 may retrieve a data model configured to generate a synthetic transformed dataset associated with the specified method of data transformation). In some embodiments, step 604 may include generating or retrieving a data model trained via process 400. A data model of step 604 may include an RNN-CNN model, an LSTM-CNN model, an attention network model, a temporal CNN model, and/or another machine learning model. Retrieving a data model may include retrieving a data model from data 231, model storage 106, and/or another data storage.

At step 606, synthetic-data system 102 may retrieve a transformed dataset based on the request, consistent with disclosed embodiments. In some embodiments, synthetic-data system 102 may retrieve a transformed dataset based on information relating to a data profile of a desired dataset. In some embodiments, synthetic-data system 102 may retrieve a transformed dataset based on a method of data transformation specified by the request.

In some embodiments, retrieving a transformed dataset at step 606 includes retrieving a stored dataset (e.g., from data 231 and/or dataset database 106) based on information relating to a data profile of a desired dataset and generating a transformed dataset based on the stored dataset by performing a method of data transformation (e.g., one or more steps of process 300). In some embodiments, the method of data transformation includes the method of data transformation specified by the request.

At step 608 synthetic-data system 102 may generate a synthetic transformed-dataset by implementing a data model, consistent with disclosed embodiments. For example, at step 608, a data model may return a synthetic transformed-dataset as an output based on the request. In some embodiments, step 608 may include generating a seed, providing the seed to a data model, and generating a synthetic transformed-dataset by implementing a data model using the seed. A seed may be a representative seed of a dataset (i.e., a seed with a data profile whose statistical properties satisfy a similarity metric measuring a degree of similarity between the seed and a dataset). A seed may be a random seed. In some embodiments, step 608 may include generating a synthetic transformed-dataset based on a retrieved transformed-dataset, consistent with disclosed embodiments. For example, at step 608, a data model may accept a retrieved transformed-dataset as an input and return a synthetic transformed-dataset as an output. In some embodiments, step 608 may include training a synthetic data model using a transformed dataset to generate synthetic data according to a performance criterion. The performance criterion may include a similarity metric between a synthetic transformed-dataset and a transformed-dataset. For example, a synthetic data model may be trained by partitioning a dataset into frames and predicting a difference between frames. as previously described.

At step 610, synthetic-data system 102 may generate a synthetic dataset by performing a data transformation on a synthetic-transformed dataset, consistent with disclosed embodiments. In some embodiments, a data transformation of step 610 may include an inverse of a data transformation previously performed at step 606. For example, at step 610, synthetic-data system 102 may generate a synthetic dataset by inverting a time-based data processing method (e.g., a method of subtraction), a normalization method, or an encoding method. In some embodiments, a data transformation of step 610 may include an inverse of a data transformation specified by the request.

At step 612, synthetic-data system 102 may provide a synthetic dataset, consistent with disclosed embodiments. Providing a synthetic dataset may include storing a synthetic dataset (e.g., in data 231 and/or dataset database 106). Providing a synthetic dataset may include transmitting a synthetic dataset to another component of system 100 (e.g., client device 110) and/or a component outside system 100. In some embodiments, step 612 may include transmitting a data model used at step 608 to another component of system 100 and/or a computing component outside system 100.

Systems and methods disclosed herein involve unconventional improvements over conventional approaches to synthetic data generation. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for generating synthetic data, comprising:
one or more memory units storing instructions; and
one or more processors that execute the instructions to perform operations comprising:
receiving a dataset comprising time series data having a plurality of dimensions;
generating a transformed dataset by performing a first data transformation on the dataset, the first data transformation comprising a time-based data processing operation;
generating a first synthetic transformed dataset by implementing a data model using the transformed dataset, the data model being configured to generate synthetic transformed data based on a relationship between data of at least two dimensions of the transformed dataset;
generating a second synthetic transformed dataset by performing a second data transformation on the first synthetic transformed dataset, the second data transformation comprising an inverse of the first data transformation;
receiving a plurality of sample datasets having a plurality of respective dimensions;

generating a plurality of transformed sample datasets corresponding to the sample datasets by performing the first data transformation on the sample datasets; and training the data model to generate synthetic transformed data based on the transformed sample datasets.

2. The system of claim 1, wherein:

the operations further comprise generating the data model; and training the data model is based on generating the data model.

3. The system of claim 1, wherein the first data transformation comprises encoding the dataset.

4. The system of claim 3, wherein encoding the dataset comprises encoding a character as a number.

5. The system of claim 3, wherein encoding the dataset comprises implementing a natural language model to encode string data as numeric data.

6. The system of claim 3, wherein encoding the dataset comprises implementing an encoder model to reduce the number of dimensions of the dataset.

7. The system of claim 1, wherein the data model comprises a recurrent neural network-convolutional neural network (RNN-CNN) model.

8. The system of claim 1, wherein the data model comprises a Long Short Term Memory Convolutional Neural Network model.

9. The system of claim 1, wherein the data model comprises an attention network model.

10. The system of claim 1, wherein the relationship comprises a correlation between at least two dimensions of the dataset.

11. The system of claim 1, wherein the first data transformation comprises vector subtraction.

12. The system of claim 1, wherein the first data transformation comprises normalization.

13. The system of claim 1, wherein the first data transformation comprises applying a logarithmic function.

14. The system of claim 1, wherein the first data transformation comprises implementing a pooling operation.

15. The system of claim 1, wherein the data model is configured to generate synthetic transformed data by at least assigning a probability to the synthetic transformed-data.

16. The system of claim 1, wherein:

receiving the dataset comprises receiving the dataset from a client device; and the operations further comprise transmitting the second synthetic transformed dataset to the client device.

17. The system of claim 1, wherein receiving the dataset comprises receiving the dataset at a cloud service.

18. A method for generating synthetic data, the method comprising:

receiving a dataset comprising time series data having a plurality of dimensions;

generating a transformed dataset by performing a first data transformation on the dataset, the first data transformation comprising a time-based data processing operation;

generating a first synthetic transformed-dataset by implementing a data model using the transformed dataset, the data model being configured to generate synthetic transformed-data based on a relationship between data of at least two dimensions of the transformed dataset; and generating a second synthetic transformed dataset by performing a second data transformation on the first synthetic transformed-dataset, the second data transformation comprising an inverse of the first data transformation;

receiving a plurality of sample datasets having a plurality of respective dimensions;

generating a plurality of transformed sample-datasets corresponding to the sample datasets by performing the first data transformation on the sample datasets; and training the data model to generate synthetic transformed-data based on the transformed sample-datasets.

19. A system for generating synthetic data, comprising:

one or more memory units storing instructions; and one or more processors that execute the instructions to perform operations comprising:

receiving, at a server, from a client device, a dataset comprising numeric time-series data having a plurality of dimensions;

generating a transformed dataset by performing a first data transformation on the dataset, the first data transformation comprising subtracting data associated with a first time point from data associated with a second time point;

generating a synthetic transformed-dataset by implementing a data model using the transformed dataset, the data model comprising an RNN-CNN model configured to generate synthetic transformed-data based on a relationship between data of at least two dimensions of the transformed dataset;

generating a synthetic dataset by performing a second data transformation on the synthetic transformed-dataset, the second data transformation comprising an inverse of the first data transformation; and transmitting, to the client device, the synthetic dataset.

* * * * *